United States Patent
Singer et al.

(10) Patent No.: US 12,498,879 B2
(45) Date of Patent: Dec. 16, 2025

(54) DUPLICATE WRITE CIRCUIT

(71) Applicant: MELLANOX TECHNOLOGIES, LTD., Yokneam (IL)

(72) Inventors: Alon Singer, Tel Aviv (IL); Uria Basher, Nehusha (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/611,951

(22) Filed: Mar. 21, 2024

(65) Prior Publication Data
US 2025/0298537 A1   Sep. 25, 2025

(51) Int. Cl.
G06F 3/06 (2006.01)

(52) U.S. Cl.
CPC .......... G06F 3/0655 (2013.01); G06F 3/0604 (2013.01); G06F 3/0673 (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048;
(Continued)

(56) References Cited

U.S. PATENT DOCUMENTS 3,889,237 A * 6/1975 Alferness ................ G06F 13/18
711/151
4,129,901 A * 12/1978 Masuda .................. G05B 19/05
700/12
(Continued)

OTHER PUBLICATIONS

RDMA—Key Technology for Arithmetic Networks; Brian; Jun. 13, 2023; retrieved from https://www.fibermall.com/blog/rdma-key-technology-for-arithmetic-networks.htm?srsltid=AfmBOoqeQ3ob2DuiqWcwPtrmgR91YCN27erSOkiJpe-ITsx16hM3OuU6 (Year: 2023).*
(Continued)

*Primary Examiner* — Daniel C. Chappell
(74) *Attorney, Agent, or Firm* — Meitar Patents Ltd.; Daniel Kligler

(57) ABSTRACT

A computer system includes a processor and a Duplicate Write Circuit (DWC). The DWC is to hold a definition that specifies an address range and a plurality of additional address ranges, and to receive, from the processor, a write command that specifies a write-data and a write-address. When the write-address falls outside the address range, the DWC is to generate a write cycle that writes the write-data to the address. When the write-address falls in the address range, the DWC is to generate (i) the write cycle that writes the write-data to the address, and (ii) a sequence of additional write cycles that write the write-data to corresponding addresses in the additional address ranges.

18 Claims, 5 Drawing Sheets

(58) Field of Classification Search
CPC .............. G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | |
|---|---|---|
| 6,122,659 A | 9/2000 | Olnowich |
| 7,107,415 B2 | 9/2006 | Jeddeloh et al. |
| 8,151,069 B1 * | 4/2012 | Blitzer ............... G06F 11/1461 711/112 |
| 8,374,175 B2 | 2/2013 | Riley |
| 2020/0026814 A1 * | 1/2020 | Basher .................... G06F 30/34 |
| 2020/0371914 A1 * | 11/2020 | Wang .................. G06F 12/0246 |

OTHER PUBLICATIONS

Y. Guo, Q. Zhuge, J. Hu, J. Yi, M. Qiu and E. H . . . -M. Sha, "Data Placement and Duplication for Embedded Multicore Systems With Scratch Pad Memory," in IEEE Transactions on Computer-Aided Design of Integrated Circuits and Systems, vol. 32, No. 6, pp. 809-817, Jun. 2013, doi: 10.1109/TCAD.2013.2238990. (Year: 2013).*

Mellanox Technologies, "Rdma Aware Networks Programming User Manual," Rev. 1.7, pp. 1-216, year 2015.

Advanced Micro Devices, Inc, "PG341—AXI Memory Initialization LogiCORE IP Product Guide (PG341) (v1.0)," pp. 1-4, May 22, 2019, as downloaded from https://japan.xilinx.com/products/intellectual-property/axi-memory-init.html#documentation.

Barak, U.S. Appl. No. 18/491,820, filed Oct. 23, 2023.

U.S. Appl. No. 18/491,820 Office Action dated Mar. 5, 2025.

* cited by examiner

DUPLICATE WRITE CIRCUIT

TECHNICAL FIELD

The present description relates generally to computer systems, and specifically to Write operations in computer systems.

BACKGROUND

To increase performance, processors in computing systems sometimes send write operation requests to a posted-write circuit, which handles the write operations, allowing the processor to continue with other tasks rather than wait for the write operations to complete. Posted writes are sometimes used for memory or I/O initialization, e.g., writing preset values to all addresses within a given range.

For posted-write background, the reader is referred to U.S. Pat. No. 7,107,415, which describes a memory module that includes a memory hub coupled to several memory devices. The memory hub includes a posted write buffer that stores write requests so that subsequently issued read requests can be coupled to the memory devices. The write request addresses are also posted in the buffer and compared to subsequent read request addresses.

When the memory devices are not busy servicing read requests, the write requests can be transferred from the posted write buffer to the memory devices. The write requests may also be accumulated in the posted write buffer until either a predetermined number of write requests have been accumulated or the write requests have been posted for a predetermined duration.

For memory and I/O initialization, see, for example, Xilinx AXI Memory Initialization, v1.0. LogiCORE IP Product Guide Vivado Design Suite PG341 (v1.0) May 22, 2019, which describes an AXI that Memory Initialization core autonomously writes an initial value to all specified address locations after power-up and following each soft reset, preventing spurious ECC errors that can occur when accessing an uninitialized memory.

SUMMARY

An embodiment that is described herein provides a computer system including a processor and a Duplicate Write Circuit (DWC). The DWC is to hold a definition that specifies an address range and a plurality of additional address ranges, and to receive, from the processor, a write command that specifies a write-data and a write-address. When the write-address falls outside the address range, the DWC is to generate a write cycle that writes the write-data to the address. When the write-address falls in the address range, the DWC is to generate (i) the write cycle that writes the write-data to the address, and (ii) a sequence of additional write cycles that write the write-data to corresponding addresses in the additional address ranges.

In some embodiments, the definition specifies the additional address ranges by specifying a periodic address increment, and the DWC is to increment the addresses of the additional write cycles in the sequence by the address increment.

In a disclosed embodiment, the DWC is to receive the definition in an initialization command from the processor. In an example embodiment, the computer system further includes a plurality of output ports, and the DWC is to send the write cycle, and each of the additional write cycles in the sequence, to a different one of the output ports. In an embodiment, in response to a received write command comprising a bypass indication, the DWC is to generate only a write cycle but no additional write cycles, regardless of whether the address specified in the received write command falls inside or outside the address range.

In another embodiment, a length of the sequence of write cycles is preset. In yet another embodiment, the DWC is to send an interrupt signal to the processor responsively to completion of the generation of the sequence of write cycles. In still another embodiment, the DWC is to set an end-of-sequence register responsively to completion of the generation of the sequence of write cycles. In an embodiment, the DWC is to maintain a transfer-count register, indicative of a number of remaining write cycles in the sequence of write cycles.

In some embodiments, the DWC includes a Content-Addressable-Memory (CAM), to store at least the address range. In some embodiments, the DWC includes a First-In-First-Out buffer, to temporarily store write commands pending for processing by the DWC.

There is additionally provided, in accordance with an embodiment that is described herein, a method including holding a definition that specifies an address range and a plurality of additional address ranges, and receiving, from a processor, a write command that specifies a write-data and a write-address. When the write-address falls outside the address range, a write cycle that writes the write-data to the address is generated. When the write-address falls in the address range, (i) the write cycle that writes the write-data to the address is generated, and (ii) a sequence of additional write cycles, which write the write-data to corresponding addresses in the additional address ranges, is further generated.

The present description will be more fully understood from the following detailed description of the embodiments thereof, taken together with the drawings in which:

DETAILED DESCRIPTION OF EMBODIMENTS

Overview

Figure 1:
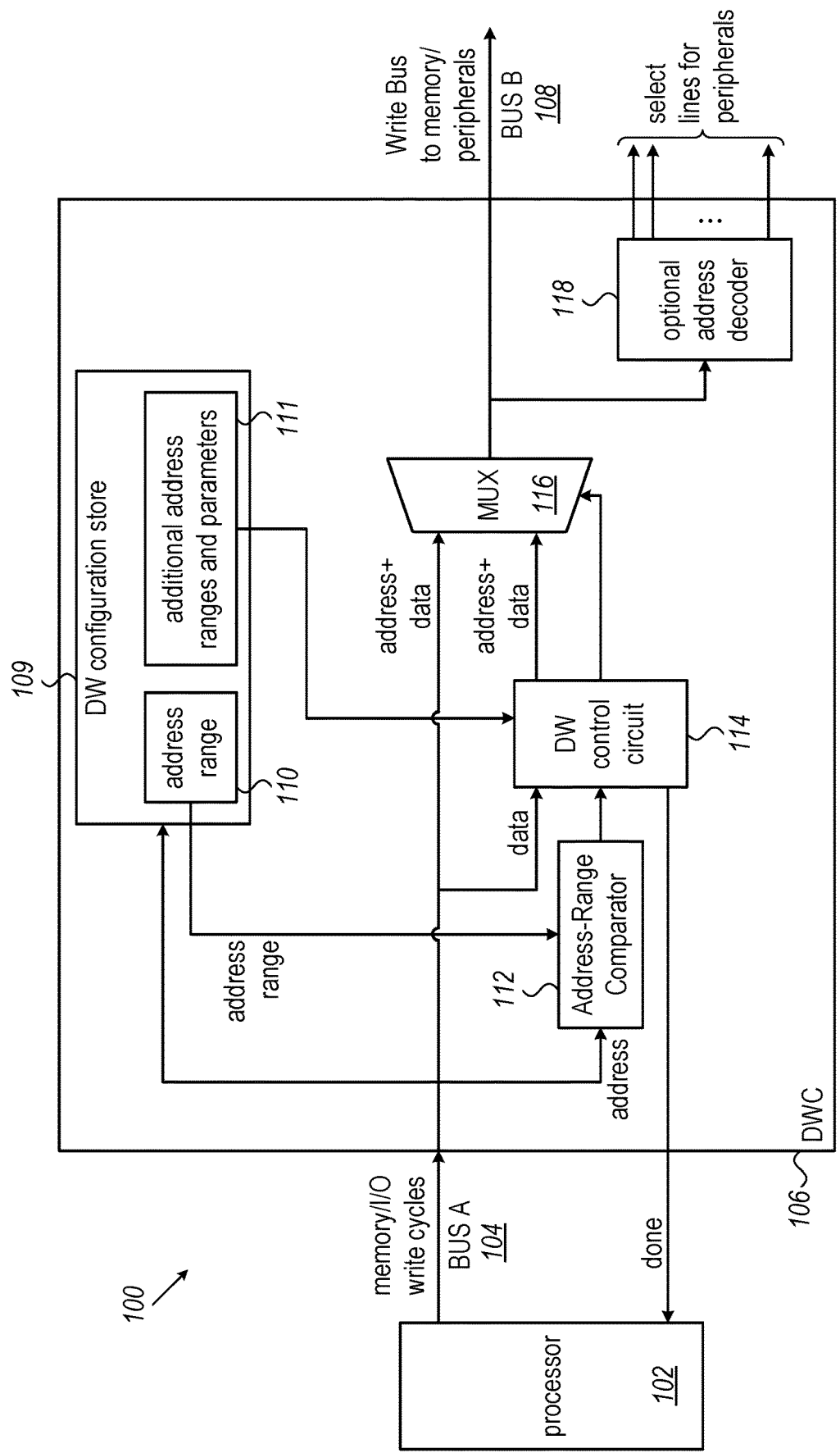
FIG. 1 is a block diagram that schematically illustrates a Computer System that includes a duplicate write circuit (DWC), in accordance with an embodiment that is described herein.

Computers sometimes write the same data sequentially to multiple locations. For example, during initialization of a network device having multiple ports, the same initial value may be written to the same register in multiple output ports.

For another example, allocated memory segments may need to be initialized (e.g., filled with constant data).

To save time, writing of the constant data may be done using posted-write cycles, in which the processor can attend other tasks while a posted-write circuit executes the write operation; however, conventionally, the processor still needs to issue multiple write cycles.

Embodiments that are described herein that are described herein provide methods and systems that allow the processor to define a sequence of write operations with constant data to locations in preset address ranges; in an embodiment, the computing system comprises a Duplicate Write Circuit (DWC) that converts some of the write cycles that the processor generates to Duplicate Write (DW) sequences.

In some embodiments, the DWC comprises a DW configuration store that stores a DW address range, which is divided into multiple sub-address-ranges (the DW address range and the sub-address-ranges will be referred to, respectively, as The Address Range and The Other Address-Ranges hereinbelow). When the processor executes a write cycle, the DWC checks if the corresponding address is within the address range. If so, the DWC will execute the single write cycle indicated by the processor, and then proceed to execute multiple write cycles, with the same data, to corresponding addresses in the other address ranges.

In some embodiments, the sub-address ranges are evenly spaced, and, hence, the DWC, during the multiple write cycles, increments the address by a constant, referred to as Increment. For example, if the address range starts at address 0x080000 and comprises 0x100 identical devices, each device comprising 0x100 registers in 0x100 consecutive addresses, the DW configuration store will define a start address=0x080000, address range size of 0xFFFF, and an Increment value of 0x100. If the processor writes 0x1234 to address (e.g. register 0x30 of the first device), the DWC will write 0x1234 to address 0x080030, then write 0x1234 to address 0x080130, to 0x080230, and so on. In an embodiment, the number of DW cycles is also stored in the DW configuration store and is referred to as Size hereinbelow.

In another embodiment, the DWC may pause the sequence if the memory is not ready. In yet another embodiment, the processor may insert write cycles within DW sequences by sending write operations with a Bypass indication (a Bypass indication instructing the DWC to bypass the duplication functionality for a certain write operation).

In some embodiments, the DWC can be configured to support multiple DW sequences, differentiated by the corresponding address ranges; for easier multi-range address detection, in some embodiments, the DWC comprises a Ternary Content-Addressable Memory (TCAM) that stores address segment definitions and compares incoming addresses to the stored addresses.

Thus, in embodiments, writing fixed data to evenly spaced addresses may be done by a DWC, offloading the processor to perform other tasks.

More details and configurations will be disclosed in the description hereinbelow, with reference to example embodiments.

System Description

We will describe hereinbelow circuits and methods that offload a processor from the task of repeatedly writing fixed data to evenly spaced memory or I/O addresses.

FIG. 1 is a block diagram that schematically illustrates a Computer System 100 that includes a duplicate write circuit (DWC), in accordance with an embodiment that is described herein. A Processor 102 (e.g., a Reduced Instruction-Set Computer (RISC)) sends memory and/or Input-Output (I/O) write cycles over a bus A 104, to a Duplicate-Write Circuit (DWC) 106. The DWC sends write cycles through a bus B 108 to memory and/or peripherals devices (not shown).

To differentiate between the write cycles that the processor sends over Bus A 104 and the write cycles that the DWC sends over bus B 108, we will sometimes refer below to the former as Write instructions; however the write instructions, in embodiments, may be similar or identical to the write cycles, and, thus, the DWC may sometimes forwards a write instruction from Bus A to Bus B.

The read path from memory and/or from the peripheral devices to processor 102 is not shown.

In embodiments, DWC 106 stores a configuration of one or more duplicate-write ranges in memory and detects if any write instruction address is within the address range. If so, the DWC generates a sequence of write cycles, transparently to the processor. The DWC configuration is stored in a DW Configuration Store 109, which, in turn, comprises an address-range register 110 to store the address range settings, and a register-set 111, to store the other address ranges, and, optionally, corresponding parameters (e.g., a Size parameters).

DWC 106 further comprises an Address Range Comparator 112, to detect if a write instruction is in the specified range, a Duplicate-Write (DW) Control Circuit 114, to control the DWC operation, and a Multiplexor 116, to route either write instruction that the processor sends or write cycles that DW Control Circuit 114 sends, to Bus B 108. (The configuration of DWC 106 will also be referred to as DWC Definition hereinbelow.)

In some embodiments, processor 102 pre-programs DWC Configuration Store 109, specifying one or more address ranges and other address ranges. When the processor sends a Write instruction over bus A 104, the Address Range Comparator 112 checks if the address of the write instruction is within any of the duplicate-write ranges. If the address is not within any of the duplicate-write ranges, the DWC Control Circuit 114 will control Multiplexor 116 to forward the write instruction unchanged, from Bus A 104 to Bus B 108. However, if the address of the write cycle is within any of the duplicate-write address ranges, the DWC Control Circuit will start a sequence of write cycles, to one of the other address ranges. The DWC Control Circuit will stop the sequence after Size write cycles, and indicate completion to the processor (e.g., by asserting an Interrupt input of the processor).

When the sequence is on-going, the DWC Control Circuit will direct Multiplexor 116 to forward the write cycles that the DWC Control Circuit generates to Bus B 108. The write data will be constant-according to the data that the processor specifies when sending the write instruction (in an embodiment, the data is latched in the DW control circuit).

In some embodiments, when the DWC is sending a sequence of write cycles, the DWC also signals to the processor that any further write instructions should be deferred. In an embodiment, the processor sends the write instructions to a First-In-First-Out (FIFO) buffer, which the DWC reads when ready, and, thus, the processor will stall further write instructions only when the FIFO is full.

In some embodiments, some, or all, of the peripheral devices coupled to Bus B 108 require a Select input, in addition, or in lieu of the address input. Towards that end, DWC 106 optionally comprises an Address Decoder 118, configured to decode the address part of Bus 108 (typically the high order bits thereof), and generate individual select lines for the addressed peripherals.

Thus, according to the example embodiment illustrated in FIG. 1 and described above, to write multiple instances of constant data to multiple addresses ranges, a processor can issue a single write instruction, saving time and power consumption.

The configuration of computing system 100 is cited by way of example, merely for the sake of conceptual clarity. Other configurations may be used in alternative embodiments. For example, in some embodiments, the size value is set with the write instruction rather than in the DW configuration; in other embodiments a size value is set in the DW configuration but can be overridden by a value provided within the write instruction. in an embodiment there is no Size—rather, the complete duplicate-write range is written.

In an embodiment, the DWC does not signal completion; instead, the processor may read a register in the DWC that is set according to the number of executed write cycles. In another embodiment the processor may indicate that a write instruction, although within the duplicate write range, should not initiate a sequence of write cycles (that is— should be routed directly to Bus B).

In some embodiments, each of the other address ranges comprises evenly spaces addresses, and, thus, the address spaces may be defined by a start address and an Increment value, e.g., the address range {0x103, 0x106, 0x109 ... } is specified by a start address of 0x100, (which is not a part of the address space) and an increment value of 3. In the embodiments described below, the start address will be the address specified in the write instruction that the processor sends, and the Increment value will be specified in the DW configuration. It should be noted that Increment, in the current context, refers to the addition of an integer number— not necessarily one and not necessarily positive.

Figure 2:
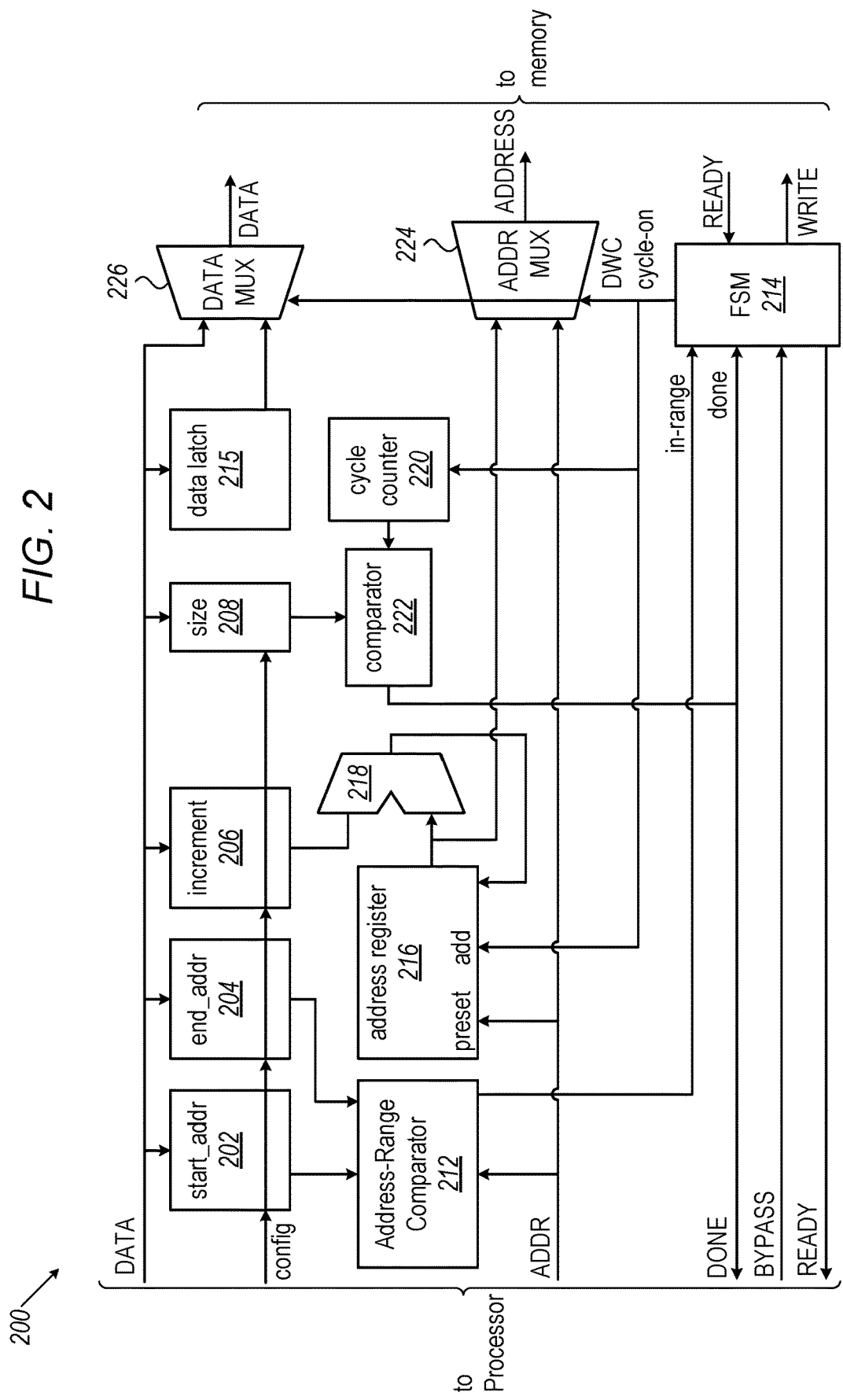
FIG. 2 is a block diagram that schematically illustrates the configuration of a DWC, in accordance with an embodiment that is described herein.

FIG. 2 is a block diagram that schematically illustrates the configuration of an DWC 200, in accordance with an embodiment that is described herein. DWC 200 receives write instructions from a processor (not shown) and sends write cycles, including duplicate-write cycles, to memory and/or peripherals (not shown). For brevity, we will refer to write cycles to memory only; the term "memory" will refer hereinbelow to memory and/or to peripherals.

The processor initializes the DWC by issuing one or more DWC configuration commands (e.g., write cycles to one or more pre-set addresses). The DWC configuration commands write the start address of the DWC address range in a Start-Address register 202, the end address of the address range in an End-Address register 204, the Increment value, by which the address of the sequential write cycles should be incremented, in an Increment register 206, and the Size of the sequence of write operations in a Size register 208 (in some embodiments, the address range is specified by a Star-Address register and a Range-Size register, instead of a Start-Address and an End-Address register).

When the processor issues a write instruction, an Address-Range Comparator 212 checks if the address is within the configured range (e.g., the address is smaller than the end address stored in End-Address register 204, and larger than or equal to the start address stored in Start-Address register 202). The Address-Range Comparator indicates whether the address is within the address range to a Finite-State-Machine (FSM) 214, which is configured to control the operation of DWC 200 and to indicate when an DWC duplicate-write cycle is on (an example embodiment of FSM 214 will be disclosed below, with reference to FIG. 3).

A Data-Latch 215 latches the data that the processor sends; the latched value will be used as the constant data value in all subsequent DW write cycles. An Address Register 216 latches the address that the processor sends, and an Adder 218 adds the Increment value stored in Increment Register 206 to the Address; the Address Register latches the incremented address when FSM indicates that an DWC cycle is on. Thus, in successive DW write cycles, the address in Address register 216 will increment according to the Increment value stored in Increment register 206.

A Cycle Counter 220 counts the duplicate write cycles, and a Comparator 222 compares the count to the Size value stored in Size register 208. When the count matches the Size value, Comparator 222 sends a Done indication to FSM 214 and to the processor (e.g., by asserting an Interrupt input of the processor).

DWC 200 further comprises an Address Multiplexor 224 and a Data Multiplexor 226. FSM 214 sends an DWC-CYCLE-ON signal to control the two multiplexors; when DWC-CYCLE-ON is high, the multiplexors forward the address and data corresponding to the current DW cycle to the memory; when DWC-ON is low, the multiplexors forward the current write instruction that the processor sends.

Figure 3:
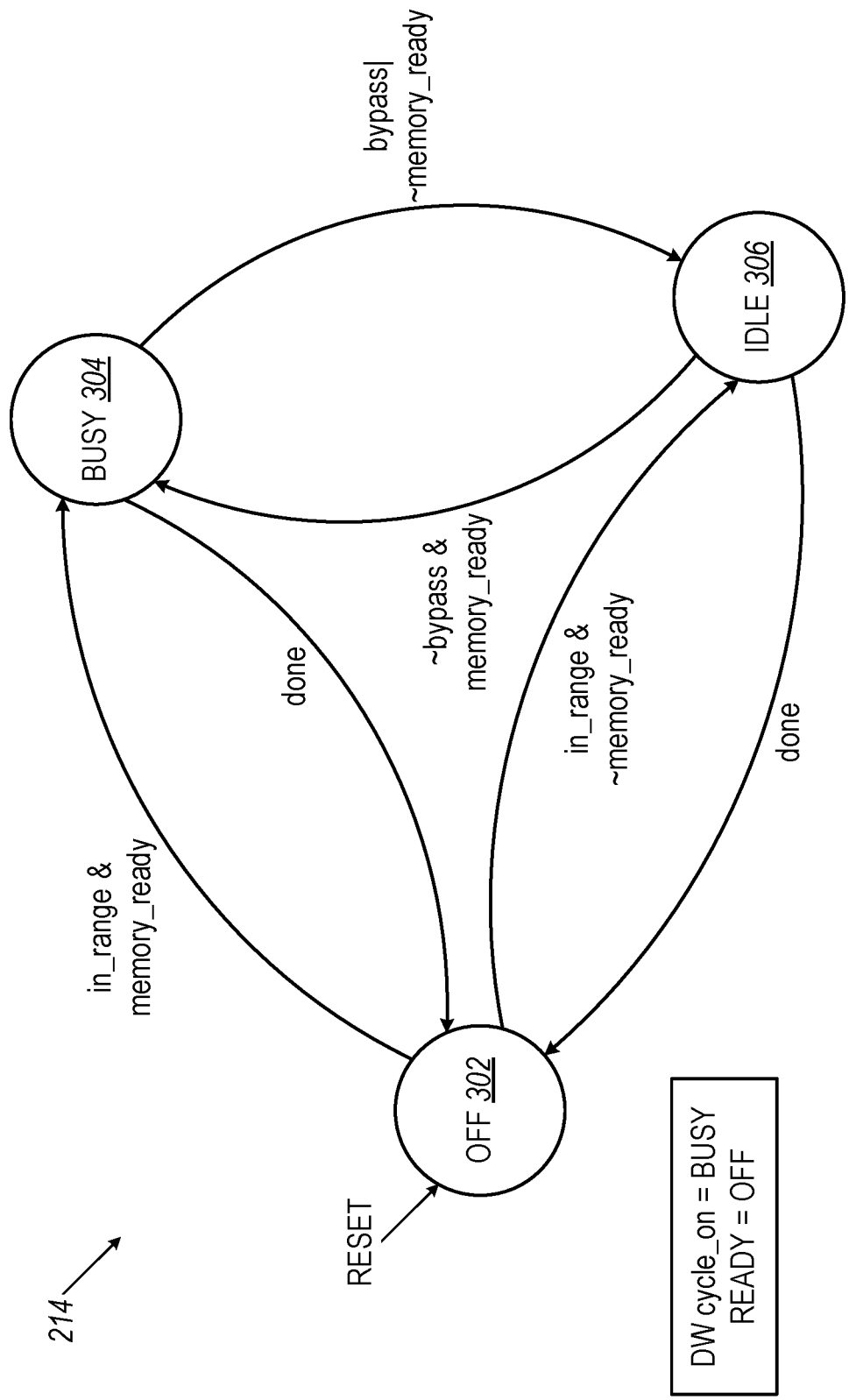
FIG. 3 is a state diagram that schematically illustrates the configuration of a DWC Finite State Machine (FSM), in accordance with an embodiment that is described herein.

FIG. 3 is a state diagram that schematically illustrates the configuration of DWC Finite State Machine (FSM) 214, in accordance with an embodiment that is described herein. FSM 214 comprises three states: an OFF state 302, a BUSY state 304, and an IDLE state 306.

After a Reset, or after a current DW session has completed, the FSM is in the OFF state. Then, if the address of a write instruction that the processor sends is within the preset address range, the FSM transits to the BUSY state 304 (if the memory is ready), or to the IDLE 306 (if the memory is not ready).

The FSM transits from the BUSY state to the IDLE state if the memory is not ready or if the processor indicates a Bypass write cycle, and from the IDLE state to the Busy state if the memory is ready and the processor does not indicate a Bypass write cycle.

The FSM asserts the DW_CYCLE_ON signal when in the BUSY state, and indicates READY to the processor when in the OFF state.

Figure 4:
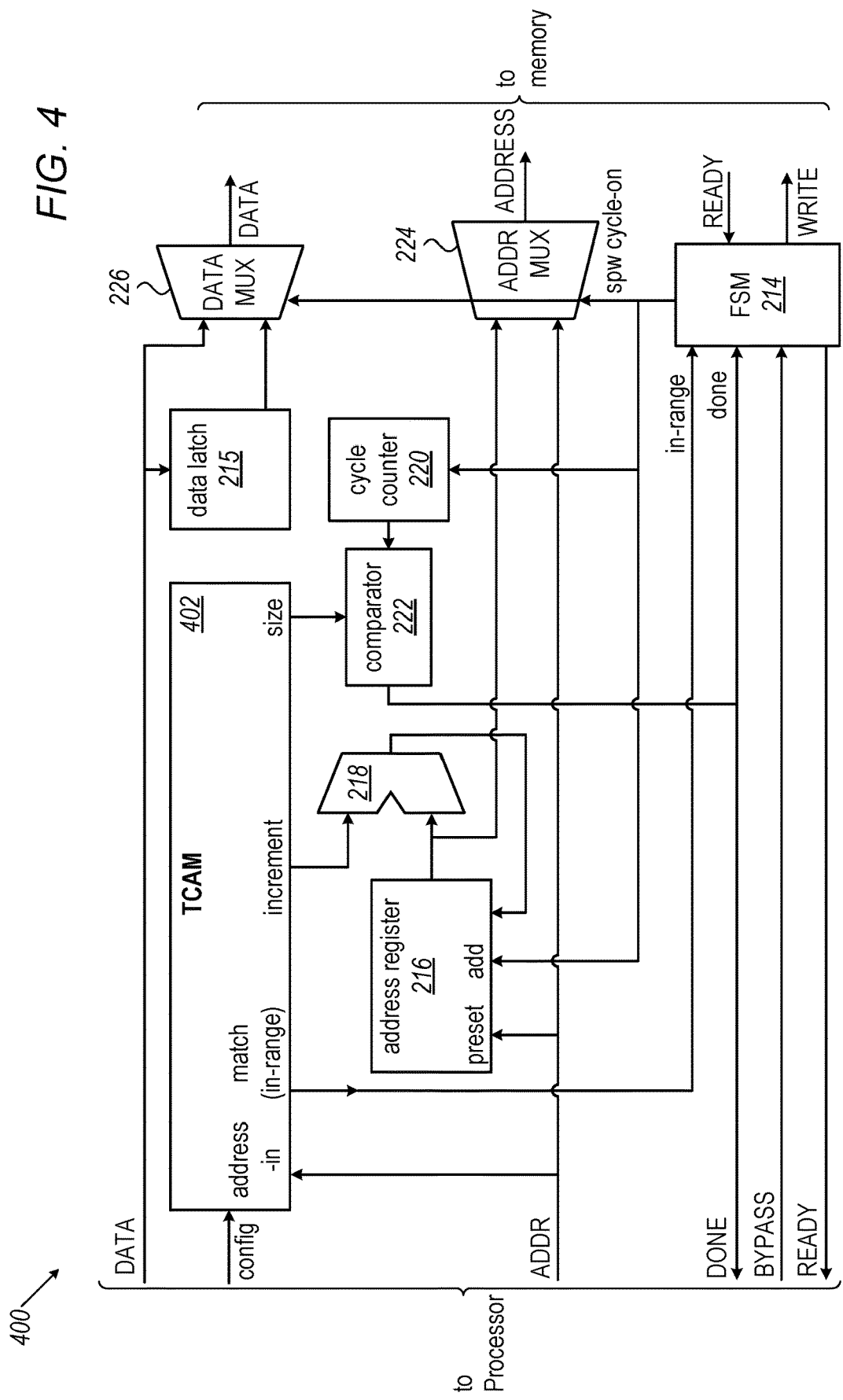
FIG. 4. is a block diagram that schematically illustrates a Ternary-Content-Addressable-Memory (TCAM)-based DWC 400, in accordance with an embodiment that is described herein.

Note that according to the example embodiment of DWC 300, illustrated in FIGS. 3 and 4, when the processor indicates a Bypass write instruction, the DWC will forward the Bypass write instruction and then continue the sequence of duplicate write cycles.

Thus, according to the configuration of DWC 200 and of FSM 214 thereof, a processor may pre-configure an address range, an increment value and a size value; further write instructions with an address in the configured address range that the processor may send, will be executed as sequences of duplicate write cycles with the same data, and with an address that is incremented according to the preconfigured increment value; the length of the sequence will equal the preconfigured Size value. The processor will be able to insert write instructions that bypass DW sequences. The DWC may, therefore, save a considerable processor time when I/O devices (peripherals), or memory segments are initialized.

The configuration of DWC 200, including FSM 214, illustrated in FIGS. 2, 3 and described hereinabove are cited by way of example. Other configurations may be used in alternative embodiments. For example, in some embodiments, more than one address range may be programmed in multiple start-address and end-address registers. In an embodiment, Cycle Counter 220 counts down from the Size value, and indicates when reaching a zero count (and, hence, Comparator 222 is not needed).

Embodiments Comprising a Ternary Content-Addressable Memory (TCAM)

The complexity of Address-Range Comparator 212 grows when the number of address ranges increases. At some point (e.g., 5 entries), a TCAM-based DWC may be a more efficient implementation.

Address ranges that are defined using a TCAM may sometimes require multiple CAM entries for each range. For example, the single range 0x380 to 0x57F may require three CAM entries—for the range from 0x380 to 0x3FF, for the range from 0x400 to 0x4FF, and for the range from 0x500 to 0x57F. However, this price may be acceptable when compared to the saving in the address range comparison associated with multiple ranges when non-TCAM comparators are used.

Here is an example of a TCAM entry definition, for the address range 0x1200 to 0x13FF, an increment value of 0x30 and a size value of 0x80. The first 16 bits are the search field (address), the next eight bits specify the increment value, and the last 8 bits specify the count value:

0001_001X_XXXX_XXXX:0011_0000_1000_0000.

FIG. 4. is a block diagram that schematically illustrates a Ternary-Content-Addressable-Memory (TCAM)-based DWC 400, in accordance with an embodiment that is described herein.

TCAM-based DWC 400 comprises a TCAM 402 that is addressable by the input address, and outputs a Match signal if the address matches an address entry that is stored in the TCAM. In addition, the TCAM outputs the preconfigured Increment and Size values that correspond to the matching address. Upon configuration, the processor programs TCAM 402 with the address ranges, the corresponding Increment and the Size values.

TCAM-based DWC 400 further comprises Finite-State-Machine (FSM) 214, Data-Latch 215, Address Register 216, Adder 218, Cycle Counter 220, Comparator 222, Address Multiplexor 224, and Data Multiplexor 226, all defined in FIG. 2 above. The Match indication of TCAM 402 is the in-range input of FSM 214. In all respects except for the in-range comparison, DWC 400 is identical to DWC 200.

Figure 5:
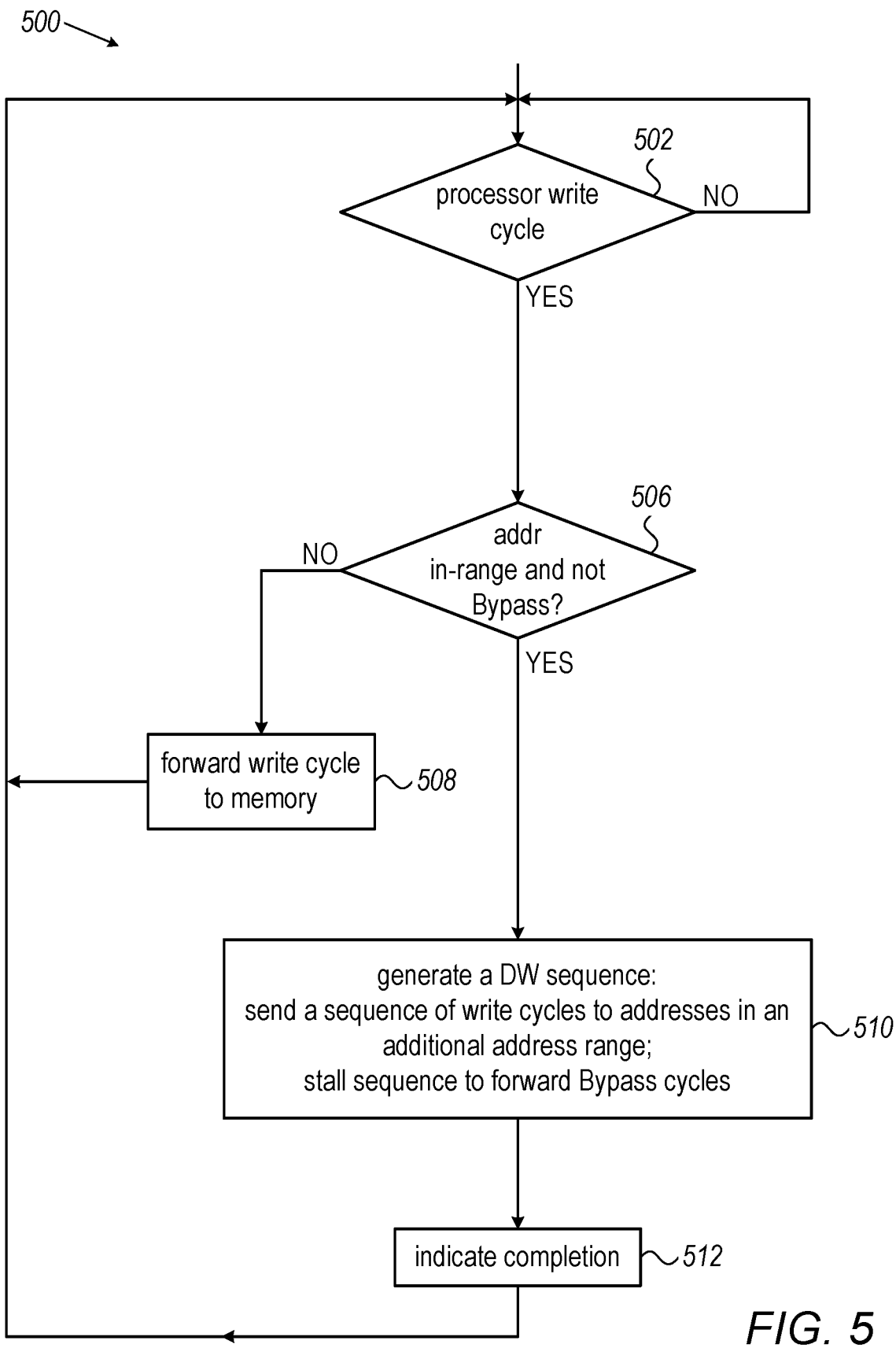
FIG. 5 is a flowchart that schematically illustrates a method for the automatic generation of duplicate write cycles, in accordance with an embodiment that is described herein.

FIG. 5 is a flowchart 500 that schematically illustrates a method for the automatic generation of duplicate write cycles, in accordance with an embodiment that is described herein. The flowchart is executed by DWC 106 (FIG. 1), that sends write cycles and DW cycles to a memory, responsively to write cycles (instructions) that processor 102 may generate. We assume below that the processor pre-programmed the DWC configuration store.

The flowchart starts at a Check Write-Cycle operation 502, wherein the DWC waits for a write cycle that the processor sends. The DWC will remain in operation 502 until the processor generates a write cycle.

If, in operation 502, a write cycle is detected, the processor enters a Check-Address-in-Range operation 506 and checks if the address that the processor has sent with the write cycle is within the specified address range, and that the processor does not indicate that the DWC should be bypassed. If the processor does indicate DWC bypass, or if the address is not within the specified address range, the DWC enters a Forward-Write operation 508, wherein the DWC forwards the write cycle that the processor sends to the memory.

If, in operation 506, the processor does not indicate DWC bypass, and if the address is within the specified address range, the DWC enters a Generate DW sequence 510, and writes to the preprogrammed other address space, using the same Data value that the processor sent in the write cycle (that was detected in operation 502), and pausing between cycles if the memory is not ready. The number of DW write cycles that the DWC generates in operation 510 equals the preprogrammed Size value. When the DW sequence is complete, the DWC enters an Indicate Completion operation 512, and indicates to the processor that the DW sequence has completed, e.g., by asserting an Interrupt input of the processor. The DWC then reenters operation 502 to wait for the next write cycle that the processor may send.

The configuration of flowchart 500 illustrated in FIG. 5 and described hereinabove is cited by way of example. Other flowcharts may be used in alternative embodiments. For example, in some embodiments, the data value is set as part of the DWC setup. In other embodiments, DWC setup parameters are loaded by means other than processor write instructions (e.g., loaded from an NVM during reset).

The configurations of computer system 100, DWC 200, FSM 214, DWC 400, and the method of flowchart 500, illustrated in FIGS. 1 through 5, are example configurations and flowcharts that are depicted purely for the sake of conceptual clarity. Any other suitable configurations and flowcharts can be used in alternative embodiments. The computer system, the DWC and components thereof may be implemented using suitable hardware, such as in one or more Application-Specific Integrated Circuit (ASIC) or Field-Programmable Gate Arrays (FPGA), using software, using hardware, or using a combination of hardware and software elements.

In some embodiments, DWC 200 and/or DWC 400, including components thereof, may be implemented using one or more general-purpose programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Although the embodiments described herein mainly address posted-write operations in a computer system, the methods and systems described herein can also be used in other applications.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove,
   as well as variations and modifications thereof which would occur to persons skilled in the art upon reading the foregoing description and which are not disclosed in the prior art.

The invention claimed is:

1. A network device, comprising:
   multiple network-device ports;
   a processor;
   and a Duplicate Write Circuit (DWC), to:
      hold a definition that specifies an address range associated with one of the network-device ports, and a plurality of additional address ranges associated respectively with others of the network-device ports, the plurality of additional address ranges differing in address values from one another and from the address range;

receive, from the processor, a write command that specifies an initialization value and a write-address;

when the write-address falls outside of the address range associated with the one of the network-device ports, generate a write cycle that initializes the one of the network-device ports by writing the initialization value to the write-address;

and when the write-address falls inside of the address range associated with the one of the network-device ports, generate (i) the write cycle that writes the initialization value to the write-address, and (ii) a sequence of additional write cycles that initialize the others of the network-device ports by writing the initialization value to corresponding different addresses in the plurality of additional address ranges associated respectively with the others of the network-device ports.

2. The network device according to claim 1, wherein the definition specifies the plurality of additional address ranges by specifying a periodic address increment, and wherein the DWC is to increment the addresses of the additional write cycles in the sequence by the address increment.

3. The network device according to claim 1, wherein the DWC is to receive the definition in an initialization command from the processor.

4. The network device according to claim 1, wherein, in response to a received write command comprising a bypass indication, the DWC is to generate only a write cycle but no additional write cycles, regardless of whether the address specified in the received write command falls inside or outside the address range.

5. The network device according to claim 1, wherein a length of the sequence of write cycles is preset.

6. The network device according to claim 1, wherein the DWC is to send an interrupt signal to the processor responsively to completion of the generation of the sequence of write cycles.

7. The network device according to claim 1, wherein the DWC is to set an end-of-sequence register responsively to completion of the generation of the sequence of write cycles.

8. The network device according to claim 1, wherein the DWC is to maintain a transfer-count register, indicative of a number of remaining write cycles in the sequence of write cycles.

9. The network device according to claim 1, wherein the DWC comprises a Content-Addressable-Memory (CAM), to store at least the address range.

10. The network device according to claim 1, wherein the DWC comprises a First-In-First-Out buffer, to temporarily store write commands pending for processing by the DWC.

11. A method, comprising:
holding a definition that specifies an address range associated with one of the multiple network-device ports of a network device, and a plurality of additional address ranges associated respectively with others of the network-device ports, the plurality of additional address ranges differing in address values from one another and from the address range;

receiving, from a processor, a write command that specifies an initialization value and a write-address;

when the write-address falls outside of the address range associated with the one of the network-device ports, generating a write cycle that initializes the one of the network-device ports by writing the initialization value to the write-address; and when the write-address falls inside of the address range associated with the one of the network-device ports, generating (i) the write cycle that writes the initialization value to the write-address, and (ii) a sequence of additional write cycles that initialize the others of the network-device ports by writing the initialization value to corresponding different addresses in the plurality of additional address ranges associated respectively with the others of the network-device ports.

12. The method according to claim 11, wherein the definition specifies the plurality of additional address ranges by specifying a periodic address increment, and wherein the DWC is to increment the addresses of the additional write cycles in the sequence by the address increment.

13. The method according to claim 11, and comprising receiving the definition in an initialization command from the processor.

14. The method according to claim 11, wherein a length of the sequence of write cycles is preset.

15. The method according to claim 11, further comprising sending an interrupt signal to the processor responsively to completion of the generation of the sequence of write cycles.

16. The method according to claim 11, further comprising setting an end-of-sequence register responsively to completion of the generation of the sequence of write cycles.

17. The method according to claim 11, further comprising maintaining a transfer-count register, indicative of a number of remaining write cycles in the sequence of write cycles.

18. The method according to claim 11, further comprising storing at least the address range in a Content-Addressable-Memory (CAM), and temporarily storing write commands pending for processing in a First-In-First-Out buffer.

* * * * *